United States Patent Office 2,697,669
Patented Dec. 21, 1954

2,697,669
METHOD OF COATING PAPER WITH CLAY COMPOSITIONS

Frederick Emerson Masterman, Georgetown, Ontario, Canada, assignor to Provincial Paper, Limited, Toronto, Ontario, Canada No Drawing. Application January 11, 1951,
Serial No. 205,601

Claims priority, application Canada June 2, 1950

1 Claim. (Cl. 117—63)

This invention relates to a method of coating paper and the novel product produced by such method. More particularly, the invention is directed to a process involving the application of a layer of non-metallic material to the surface of paper.

The use of coated paper is very common and especially paper coated with non-metallic material such as clay, chalk and equivalent material. The usual practice is to mix the non-metallic filler with an adhesive composition and the resulting mixture is then applied uniformly to the surface of the paper. The resulting paper has a smooth finish and a higher gloss than uncoated paper.

It is an object of the present invention to reduce the amount of adhesive customarily used in the coating process and, at the same time, produce a paper of excellent finish and increased water resisting properties.

In the present invention, a primary layer of adhesive composition is first applied to the surfaces of the paper to be coated. Over this primary layer of adhesive material a secondary film of non-metallic material such as clay and/or other pigments is applied and, after this has dried, a top or tertiary layer or film of adhesive composition is spread if further scuff and waterproofing is desired. The apparatus for carrying out the process of this invention is of the type customarily used in the trade and accordingly will not be described in detail in this specification.

The paper to be treated by this process may be of any variety with obvious limitations to paper stock which would not be suitable for the making of a coated paper and which limitations are well recognized by the trade. In the first step of the process, a layer of adhesive material is spread by conventional methods known to the art over the surface or surfaces of the paper. The adhesive used may consist of any of the normal adhesives used for coating paper or may consist of any type of adhesive material which may be applied to the surface of paper and which will be, at least, partially resolubilized by the coating material which is applied in the second step. Adhesives which have been found to be successful in trials include those made from polyvinyl alcohol, polyvinyl alcohol and animal glue, polyvinyl alcohol and acid starch, polyvinyl alcohol and dextrine, animal glue, glue and dextrine, starch and dextrine, dextrine, acid starch, basic starch, casein, and latex.

The amount of adhesive applied will depend upon the nature of the particular adhesive used although it has been found that from a fraction of a pound to two pounds of adhesive per ream of finished paper (500 sheets 25 x 38 inches) will be sufficient. Larger quantities of adhesive may be used without departing from the spirit of the invention.

After the adhesive layer has been applied, the filler or secondary layer is then spread uniformly over the preliminarily treated paper by the use of conventional methods known to the trade. This intermediate layer preferably consists of an aqueous dispersion of an acid flocculated non-metallic material such as clay, lithopone, rutile titanium calcium, rutile titanium dioxide and talc. Although it is preferable to use filler material which has been acid flocculated, it has been found that neutral and other material will function though not with the same degree of satisfaction as the acid flocculated filler.

The aqueous filler coating composition is preferably applied in a hot condition to the surface of the paper in order to accelerate drying of the coating and lower the viscosity of the composition. It has been found that a temperature of 190° F. will give quite satisfactory results. This temperature should not be considered as limiting the scope of the invention as the exact temperature used will vary with the coating apparatus, the nature of the coating composition and the consideration of the individual machine operator. Obviously, the particle size of the non-metallic material constituting the filler layer must be extremely small in order to produce a paper of smooth texture and uniform appearance. It has been found that the particle size range of the pigments used extends from .02 to 20 microns in size and 70% or more of the material should be below 10 microns in size. The content of solids in the aqueous coating composition will again vary with the nature of the filler material used, for example, with various grades of American clays a pulp having 60% solids or less will give satisfactory results, with lithopone, a satisfactory coating has been produced with 72% solids and when various complex titanium pigments are used a slurry having a solids content of 45% has been used. The solids content of the composition will be largely governed by the particular coating apparatus used.

The filler composition as stated before consists essentially of certain non-metallic materials and water but there may be added small amounts of:

(1) Soap, ammonium stearate, bentonite and similar thixotropifying agents which tend to increase the speed and consistency of application by eliminating dilatency of the pigment;

(2) A plasticizing agent such as glycerine and glycerine substitutes which gives the coating greater folding qualities;

(3) small amounts of adhesives may be added if a very hard sized coating is desired;

(4) Wetting agents may be added to the filler composition to improve the bond between the filler layer and the preliminary adhesive layer.

After the intermediate or filler layer has set, a top or tertiary coat consisting of a very thin layer of adhesive may then be applied if further waterproofing and scuffproofing are desired. Any of the adhesives mentioned in connection with the preliminary coating may be used and, if desired, pigments may be incorporated with the adhesive to produce a coloured effect.

The process described above results in many operating advantages over conventional methods. For example, there is substantial reduction in the amount of adhesive used. In standard methods from 10 to 25% of the coating mixture consists of adhesive whereas in the present process not more than 8% is needed.

It has been found, in actual operation, that the rate of production is substantially increased by using the novel process described herein with no loss of control over the quality of the finished product. In addition, the amount of calendering required to produce a high quality paper is decreased which results in increased production and a saving in operation.

The product resulting from the exercise of the novel process has better compressibility, flexibility, brightness, opacity and printability than normal coated paper. The smoothness of the paper compares favourably with papers produced by existing methods.

It is preferred to carry out the process with an acid flocculated clay or other similar material having a pH of approximately 4.0. The preferred method for producing partially acid flocculated clay is as follows:

Commercial clay of a type used in the manufacture of coated paper is made into a slurry form with water by any of the procedures used in the trade. The pH or acidity of the clay slurry is then reduced to the desired point, preferably pH 4.0, by addition to the slurry of acids and/or acid producing salts. Acids which may be used are sulphuric and/or hydrochloric acid and/or acid producing salts such as aluminum sulphate. The purpose of such addition is to partially flocculate the clay. Other flocculating agents, for example silica-gel, might be used. When dealing with pigments other than clay the pigment slurry as described herein may be brought into a semi-flocculated condition by various means such as the addition of acids, acid producing salts and/or agents which produce flocculaton or partial flocculation such as silica-gel or other well-known substances.

The composition described above is applied hot by any suitable method. The coating on the paper sets up very rapidly after application, so that the next coating stage can follow immediately without drying or with some drying if preferred. Unless a top layer of adhesive is applied, the coating, although it is smooth, dense and water resisting, may not be as scuff-proof as desired. After the top layer of adhesive is applied the paper may be calendered or processed by methods well-known to the trade.

It has been discovered that partially acid flocculated clay, when applied to pre-adhesive treated paper and dried, forms a dense, water resistant but flexible layer. This is likely due to the fact that when acid flocculated clay is dried or precipitated the plate-like clay particles leaf against each other so closely that water is unable to penetrate between them. The water in the clay layer before drying sufficiently resolubilizes the adhesive layer so that a firm bond is formed between the clay layer and the paper. Experience has shown that when coated paper is printed and the tackiness of the ink causes a well-known defect called "plucking," in most cases the break occurs either at the coating-paper interface or within the paper itself. In the present process, the adhesive is used almost entirely at the interface where it is considered to be most effective.

The process described above is readily carried out by apparatus with which those skilled in the art are well acquainted. For example, the adhesive layers may be applied by means of a brush coater and the clay or pigment layer by means of a roll coater.

The invention has been particularly described with reference to its application to a paper base for convenience of description but it has also been found to provide a desirable coating on textiles, cellophane, plastic films, felt and other pliable film type materials. In the accompanying claim the term "film type material" is intended to include the materials mentioned above.

I claim:

A process or coating film type material such as paper comprising applying a thin water soluble adhesive coating to the paper at the rate of less than two pounds per ream, substantially drying said adhesive coating, then coating said adhesive coating with a layer of a hot acidic aqueous dispersion composed substantially entirely of an acid flocculated material selected from the group consisting of clay, lithopone, rutile titanium, calcium, rutile titanium dioxide and talc and having a particle size ranging from 0.02 to 20.0 microns, said layer partially resolubilizing the adhesive coating to be bonded thereto, and then drying said layer.

References Cited in the file of this patent

UNITED STATES PATENTS

| Number | Name | Date |
|---|---|---|
| 1,591,238 | Schaefer | July 6, 1926 |
| 2,263,576 | Glenn | Nov. 25, 1941 |
| 2,286,259 | Cagle | June 16, 1942 |
| 2,417,924 | Gary | Mar. 25, 1947 |